Patented July 1, 1947

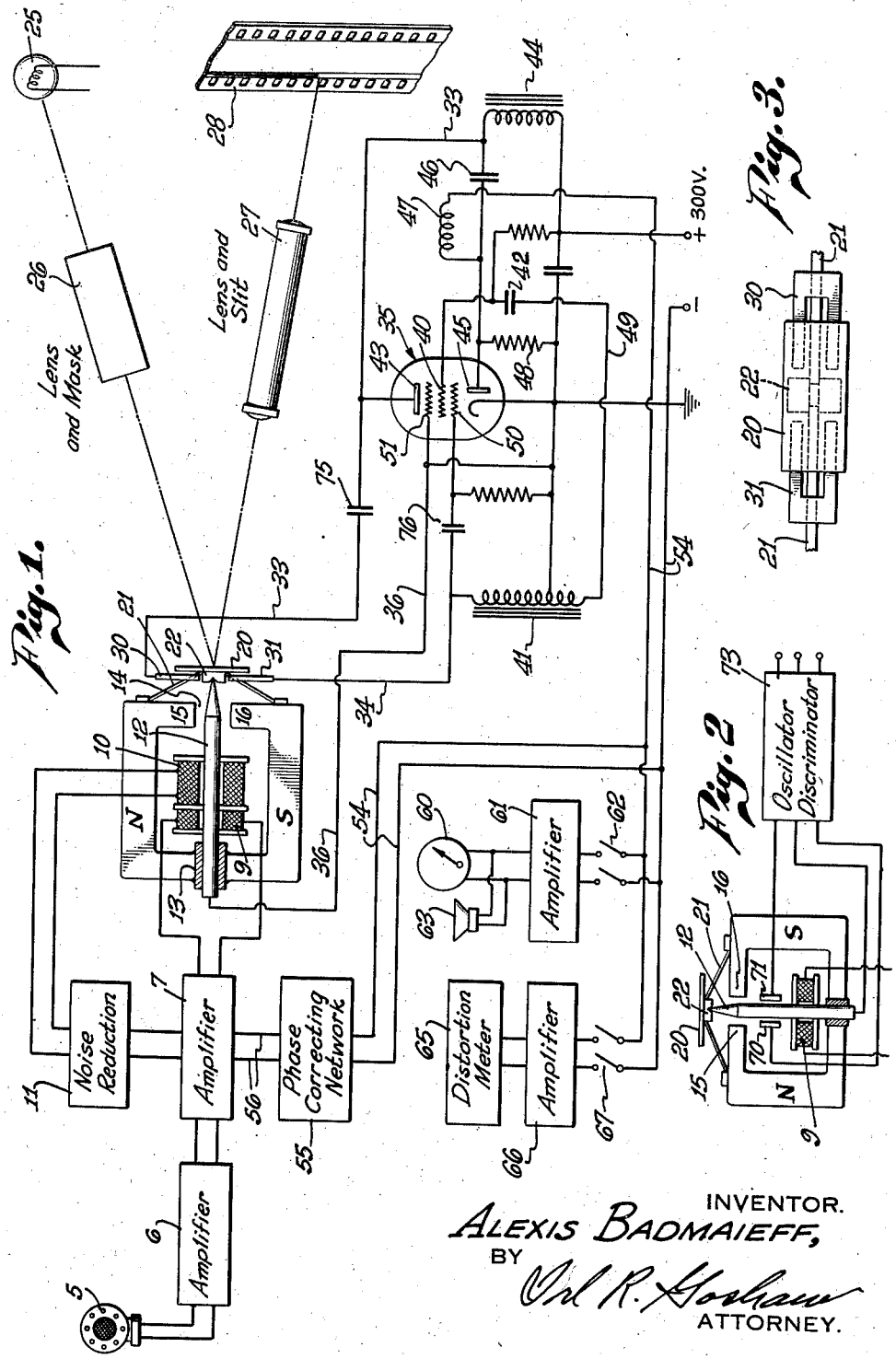

2,423,285

UNITED STATES PATENT OFFICE 2,423,285

FREQUENCY MODULATION FEED-BACK CIRCUIT FOR SOUND RECORDING GALVANOMETERS

Alexis Badmaieff, Los Angeles, Calif., assignor to Radio Corporation of America, a corporation of Delaware Application November 28, 1944, Serial No. 565,439

8 Claims. (Cl. 179—100.3)

This invention relates to sound recording, and particularly to a feedback, measuring, or monitoring circuit for a galvanometer or oscillograph used in translating electrical energy into mechanical motion.

In a well-known type of commercial sound on film recording system, galvanometers are used for vibrating a light beam in accordance with variations in electrical currents corresponding to sound waves, one such type of galvanometer being disclosed and claimed in Dimmick Patent No. 1,936,833 of November 28, 1933. The galvanometer of this patent has the usual magnetic field structure and an armature with coils positioned thereon for vibrating the armature. The mirror is mounted at one end of the armature under tension so that it will oscillate about the tip of the armature. It is well-known that a mechanical device of this nature has mechanical resonance which affects the proportionality between the amplitudes of the currents impressed on the galvanometer and the mechanical displacement of the mirror which controls the position of the light beam. Thus, to obtain the desired proportionality or linearity between the input voltage or current and the light beam movement, it has been found necessary to introduce feedback from the galvanometer to a point in the electrical circuit.

This problem has existed for some time, and many suggestions have been made for solving it. For instance, Wilhelm Patent No. 2,194,175 of March 19, 1940, discloses and claims the use of a feedback pickup coil on the armature itself as well as a photoelectric cell pickup located in the light beam. Wolfe Patent No. 2,270,367 of January 20, 1942, also shows a feedback system using a pickup coil on the galvanometer armature, the construction being such that no inductive coupling exists between the driving coil and the pickup coil. Singer Patent No. 2,292,166 of August 4, 1942, also shows a feedback photocell pickup in the light beam after modulation by the galvanometer. Although these prior systems have their respective merits, efforts are still being made to better solve the problem of obtaining a mirror movement which is directly proportional to the input voltage or current impressed on the galvanometer over the audio frequency range. A more recent type of feedback circuit for this purpose is disclosed and claimed in Albin Patent No. 2,357,623 of September 5, 1944.

The present invention is a still further improvement in feedback circuits, particularly in the detecting element which overcomes certain disadvantages of the prior systems, such as the necessity for a velocity effect equalizer required by the Albin system. Another feature of the present circuit is that it may be applied to any standard galvanometer structure and that it detects the voltage produced solely by the movements of the mechanical modulating elements in exact proportionality and phase. It may also be applied to other types of translators either electrical to mechanical, or mechanical to electrical. The basic principles of balanced or push-pull frequency modulation detection as disclosed and claimed in my copending application, Ser. No. 490,614, filed June 12, 1943, are utilized, thereby securing the maximum in sensitivity, stability, and accuracy in detection of mechanical movements.

The principal object of the invention, therefore, is to facilitate the recording of sound waves.

Another object of the invention is to maintain a constant linear relationship between the amplitude of the input voltage to the electrical to mechanical translator and the mechanical displacement of an element actuated by the input voltage.

A further object of the invention is to provide an improved feedback system for a sound recording galvanometer wherein the feedback voltages are generated by a frequency modulation circuit.

A further object of the invention is to facilitate the obtaining of voltages directly proportional to the movements of a mechanical element driven by electrical currents by the use of frequency modulation.

A further object of the invention is to provide an improved monitoring and distortion measuring system for a sound recording galvanometer.

A still further object of the invention is to monitor a sound recording element by balanced or push-pull frequency modulation detection of the movements of the recording modulator.

A still further object of the invention is to measure the distortion in an electrical current to mechanical movement translator by balanced or push-pull frequency modulation detection.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a diagrammatic view of a sound recording system embodying the invention.

2,423,285

3

Fig. 2 is a diagrammatic view showing another embodiment of the invention, and

Fig. 3 is a detailed view of the detecting element of the galvanometer shown in Fig. 1.

Referring now to Fig. 1, a microphone 5 translates acoustic sound waves to be recorded into electrical currents which are amplified in an amplifier 6 and an amplifier 7 for impression upon the actuating coil 9 of the galvanometer of the type shown in the above mentioned Dimmick patent. A second actuating coil 10 is shown connected to a noise reduction amplifier 11, which, in turn, is connected to the signal amplifier 7 so that noise reduction may be obtained by the biased galvanometer method well-known in the art. Only coil 9 may be used, however, if noise reduction is obtained by shutters.

The galvanometer armature 12 is anchored at 13 and vibratable in an air gap 14 formed between the pole pieces 15 and 16 of the magnet. A mirror 20 is held on the knife edge end of the armature 12 by a metallic suspension strip or ribbon 21 which is attached to a small plate 22 which has one surface fitted over the knife edge of the armature 12, the knife edge serving as a pivot about which the mirror 20 is vibrated in response to movements of the armature 12.

The movement of the mirror 20 vibrates a light beam which may be produced by a source of light 25 and projected to the mirror 20 through a lens and mask combination 26. After reflection by the mirror, the light beam is passed through a lens and slit combination 27 to the film 28 in a manner well known in the art to produce a variation in light upon the film 28 corresponding to the variations in the sound waves impressed on the microphone 5.

Referring again to the galvanometer structure, located under and adjacent to the mirror 20 are two condenser plates 30 and 31 which are connected over respective conductors 33 and 34 to a vacuum tube 35, which may be of the 6SF7 type, or any other type which will provide a cathode, an anode 43, an oscillator grid 50, an oscillator anode 40, a suppressor grid 51, and an auxiliary anode 45. The notched construction of the detector plates 30 and 31 to avoid the ribbon 21 is illustrated in Fig. 3. The auxiliary anode 45 of tube 35 cooperates with the cathode of the tube to provide the necessary rectification, the suppressor grid 51 acting as an electrostatic shield for the grid 40 and the other elements. The armature 12 itself is connected to ground along with grid 51 over conductor 36. The circuit of tube 35 is described in detail in my above mentioned copending application, so its operation will only be described briefly herein.

The condenser plate 30 is connected over blocking condenser 75 to the anode 43 and the discriminator coil 44 for the purpose of varying the resonance of this coil. The condenser plate 31 is connected over conductor 34 to the oscillator coil 41 for the purpose of varying the frequency of generation of high frequency currents, the two actions being 180 degrees out-of-phase, or in push-pull. Two condensers are thus formed between the plates and the silvered or metallic back of the mirror. In this oscillator-discriminator circuit, the screen grid 40 functions as an oscillator plate and feeds into the lower part of the coil 41 over conductor 49 and blocking condenser 42, which couples the oscillator anode 40 to the oscillator tank circuit. The plate 45 of tube 35 is connected to discriminator coil 44 which feeds its output energy to diode 45 by means of coupling condenser 46. The radio frequency choke 47 is inserted to prevent radio frequency from being present in the audio frequency signal. Resistor 48 is the detector load resistor. A blocking condenser is shown at 76.

4

The output of the discriminator in conductors 54 is a current having an amplitude directly proportional to the movements of the mirror 20 over the plates 30 and 31 and may be used for several purposes. As shown in Fig. 1, it is impressed on a phase correcting network 55 which is for the sole purpose of compensating for the phase shift in the circuits of tube 35 and the amplifier 7 to which it is connected over conductors 56. Since the detected voltages are not influenced by induction, or any other factors related to the operation of the galvanometer, the voltage derived in conductors 54 is a voltage whose amplitude, phase, and frequency is directly proportional to the actual movements of the armature 12. By impressing this voltage in a 180 degree phase relationship, which it has at the point of pickup on the amplifier 7, a linear relationship between the amplitude of the currents impressed on the galvanometer and the movements of the light beam are obtained, as illustrated in the characteristics shown in the above mentioned patents.

The output of the discriminator in conductors 54 may also be impressed on a monitoring device, such as a neon tube or pointer type of volume indicator as shown at 60, or a monitoring loud speaker 63 or both over amplifier 61 when a switch 62 is closed for monitoring the amplitude of the currents impressed on the galvanometer. Since the output voltage of the discriminator is directly proportional to the amplitude of the armature movements, the reading on meter 60 will provide a true indication of the sound volume. The output may also be fed into a distortion meter 65 over amplifier 66 when a switch 67 is closed for measuring the distortion produced in the translation of the electrical currents into mechanical motion.

Referring now to Fig. 2, a modification of the galvanometer of Fig. 1 is shown. The galvanometer of Fig. 2 is of the same general construction as the one in Fig. 1, except that a pair of detector plates 70 and 71 are positioned on each side of armature 12 in place of the bias coil 10 of Fig. 1. Where noise reduction is obtained with shutters in the light beam, the coil 10 is not necessary, thus providing a location for the detector plates within the galvanometer. Since detection is by frequency modulation, the varying field of coil 9 does not affect the input to the discriminator circuit shown at 73, which may be the same as that shown in Fig. 1. The output of the discriminator may be connected to the signal amplifier, a monitor meter, or loud speaker, or a distortion meter, as shown in Fig. 1. Since the detected voltage generated is 180 degrees out of phase with the currents impressed on the galvanometer, the feedback circuit requires no phase shifting networks, except, as mentioned above, those necessary to compensate for the phase shift in the interconnecting circuits.

In the use of the above system, it has been found to be very sensitive and particularly accurate with respect to the detection of all amplitudes and frequencies of armature movements, since the pickup action is push-pull and utilizes radio frequency modulation so that the amplitude of the generated voltage is directly proportional to the amplitude, waveform, phase, and frequency of the armature movements. This action eliminates the use of velocity equalizers. It will be understood that the detection circuit may also be applied to the measurement of the movements of any mechanical element, such as loud speaker diaphragms and the like.

I claim as my invention:

1. An electromechanical device comprising a vibratable armature, a mirror adapted to be oscillated by the vibrations of said armature, an oscillator-discriminator circuit, and means associated with said mirror and connected to said oscillator-discriminator for producing a voltage varying in accordance with the movements of said armature and said mirror, said means including a pair of condenser plates connected and functioning in push-pull relationship with the movements of said armature and mirror.

2. In a system for obtaining a current proportional to the mechanical movement of the mirror of a galvanometer, the combination of a source of electrical currents, a galvanometer having an armature and a coil surrounding said armature, the impression of electrical currents on said coil producing vibrations of said armature, an oscillator-discriminator, and means associated with said galvanometer for varying the output of said oscillator-discriminator in accordance with the vibrations of said armature, said means providing push-pull frequency modulation and detection of said armature vibrations.

3. A galvanometer comprising a magnetic field producing means having an air gap therein, an armature in said gap, a coil for varying the field around said armature, a mirror located on the end of said armature, and condenser plates located adjacent said mirror, vibrations of said mirror varying the capacitance between said plates and said mirror.

4. A galvanometer comprising means for producing a magnetic field, an armature adapted to be vibrated in said field, a mirror vibrated by the vibrations of said armature, and a pair of condenser plates arranged adjacent said mirror so that movement of said mirror in one direction increases the capacitance between said mirror and one of said plates and decreases the capacitance between said mirror and said other plate.

5. A system for obtaining electrical energy proportional to the vibrations of the mirror of a galvanometer comprising an armature for said galvanometer, a mirror for said galvanometer, means associated with said armature for causing a signal current to vibrate said armature and said mirror, means for interconnecting said mirror and said armature for causing said mirror to vibrate in accordance with the vibrations of said armature, and means associated with said armature and mirror for generating a voltage whose amplitude, waveform, and frequency are directly proportional to the movements of said armature and mirror, said last mentioned means including a generator of high frequency currents.

6. A system in accordance with claim 5 in which said last mentioned means also includes a pair of condenser plates adjacent said armature for varying the tuning of said oscillator.

7. A circuit for a galvanometer having a vibrating mirror comprising means for impressing a signal current on said galvanometer, an oscillator circuit for generating a high frequency current, a discriminator circuit for detecting frequency variations in said current, a pair of condenser plates associated with said galvanometer and connected to said oscillator and discriminator circuits, vibrations of said mirror varying the capacitance between said plates in a push-pull relationship, said push-pull capacitance variations varying the frequency of generation of high frequency currents, said discriminator circuit providing an output voltage proportional to the variation in said frequency, and means for connecting the output of said discriminator circuit to said first mentioned means.

8. A feedback circuit in accordance with claim 7 in which said condenser plates are positioned adajacent said mirror, the capacitance between said mirror and one of said plates increasing simultaneously with the decrease in the capacitance between said mirror and said other plate.

ALEXIS BADMAIEFF.

REFERENCES CITED

The following references are of record in the file of this patent:

UNITED STATES PATENTS

| Number | Name | Date |
| --- | --- | --- |
| 2,024,608 | Smythe | Dec. 17, 1935 |
| 2,321,370 | Dubilier | June 8, 1943 |
| 2,341,706 | Fields | Feb. 15, 1944 |
| 1,535,538 | Maxfield et al. | Apr. 28, 1925 |
| 2,208,091 | Zakarias | July 16, 1940 |
| 1,786,436 | Leffler | Dec. 20, 1930 |
| 2,302,219 | Hostetler | Nov. 17, 1942 |